United States Patent
Mayer

(10) Patent No.: US 7,480,254 B2
(45) Date of Patent: Jan. 20, 2009

(54) SYSTEM, APPARATUS, AND METHOD FOR PROVIDING MULTI-APPLICATION SUPPORT USING A SINGLE PROTOCOL STACK

(75) Inventor: Georg Mayer, Espoo (FI)

(73) Assignee: Nokia Corporation, Espoo (FI)

( * ) Notice: Subject to any disclaimer, the term of this patent is extended or adjusted under 35 U.S.C. 154(b) by 1106 days.

(21) Appl. No.: 10/448,248

(22) Filed: May 28, 2003

(65) Prior Publication Data

US 2004/0243680 A1 Dec. 2, 2004

(51) Int. Cl.
H04L 12/28 (2006.01)
(52) U.S. Cl. .................. 370/254; 709/202; 709/227
(58) Field of Classification Search ............... None
See application file for complete search history.

(56) References Cited

U.S. PATENT DOCUMENTS

2002/0131395 A1* 9/2002 Wang ..................... 370/349
2004/0122896 A1* 6/2004 Gourraud ................ 709/204
2004/0186918 A1 9/2004 Lonnfors et al.

OTHER PUBLICATIONS

Crocker et al., "Augmented BNF for Syntax Specifications: ABNF", RFC 2234, Nov. 1997.
Rosenberg et al., "SIP: Session Initiation Protocol", RFD3261, Jun. 2002.

* cited by examiner

Primary Examiner—Chi H. Pham
Assistant Examiner—Phuc Tran
(74) Attorney, Agent, or Firm—Hollingsworth & Funk, LLC

(57) ABSTRACT

A system, apparatus and method for identifying particular applications in a multi-application terminal environment to which incoming network messages should be directed. A registration message is generated at a terminal having multiple applications, and is transmitted to a registrar to be registered. The registration message includes a user address of record, and at least one contact header including at least a contact Uniform Resource Identifier (URI) of the terminal and an application identifier of one of the applications. Incoming messages subsequently received at the terminal include the registered application identifier of one of the SIP-related applications operating at the terminal, such as included with an optional field of the terminal URI. Upon receipt of the incoming message, the terminal forwards it to the application identified by the application identifier.

32 Claims, 8 Drawing Sheets

SYSTEM, APPARATUS, AND METHOD FOR PROVIDING MULTI-APPLICATION SUPPORT USING A SINGLE PROTOCOL STACK

FIELD OF THE INVENTION

This invention relates in general to network communications, and more particularly to a system, method, and apparatus for identifying particular applications in a multi-application terminal environment to which incoming network messages should be directed.

BACKGROUND OF THE INVENTION

Advances in communication infrastructures and protocols have allowed standard computing devices to become valuable communication tools. Computers communicate with each other, and with other electronic devices, over networks ranging from local area networks (LANs) to wide reaching global area networks (GANs) such as the Internet. Other electronic devices have experienced similar transformations, such as mobile phones, personal digital assistants (PDAs), and the like. Today, these wireless devices are being used for a variety of different types of communication. For example, while the analog mobile phone was traditionally used for analog voice communications, the present-day mobile phone is a powerful communication tool capable of communicating voice, data, images, video, and other multimedia content. PDAs, once the portable calendaring and organizational tool, now often include network communication capabilities such as e-mail, Internet access, etc. With the integration of wireless and landline network infrastructures, information of all types can be conveniently communicated between wireless and landline terminals.

To facilitate effective communication over such networks, many new protocols have been developed. One particularly popular and promising protocol that allows digital multimedia to be communicated to and from mobile and landline computing devices is the Session Initiation Protocol (SIP). SIP is a signaling protocol that assists digital devices in establishing end-to-end multimedia sessions. SIP provides features that resemble those provided by the Public Switch Telephone Network (PSTN) as well as Internet protocols such as Transmission Control Protocol/Internet Protocol (TCP/IP) and Hypertext Transfer Protocol (HTTP). SIP operates similarly to HTTP, in that it is a text-based message protocol operating on a well-known network port. From the terminal's perspective, SIP is different than HTTP because the terminal includes a listening process to be notified of incoming communications. In contrast, a web browser utilizing HTTP is purely a client, i.e., the browser initiates connections to listening servers at the user's request, and does not listen for incoming connections.

For some network communications, such as pure SIP and IP multimedia subsystems (IMS) implementations, the user equipment may provide different functionalities concurrently. For example, one application may allow the user to make multimedia calls, while another enables other users/servers to subscribe to the user's location information. However, in order for multiple applications to be used in this manner, the terminal must determine which application an incoming message should be directed to. One manner of achieving this goal is to provide a SIP stack for each of the different applications operating at the terminal. This, however, is inefficient and utilizes a great deal of resources. Another manner in which this could be effected is to distinguish applications by different port numbers. However, this is not possible with IMS, as the port number must not be changed by the SIP stack, as it is pre-assigned by the underlying IPSec Security Association.

Accordingly, there is a need in the communications industry for a manner of effectively identifying the appropriate application in a multi-application environment to which incoming messages should be directed. The present invention fulfills these and other needs, and offers other advantages over the prior art.

SUMMARY OF THE INVENTION

To overcome limitations in the prior art described above, and to overcome other limitations that will become apparent upon reading and understanding the present specification, the present invention discloses a system, apparatus and method for identifying particular applications in a multi-application terminal environment to which incoming network messages should be directed.

In accordance with one embodiment of the invention, a method is provided for directing messages in signaling protocol communications occurring over a network. An application identifier is registered for each of a plurality of signaling protocol applications available at the terminal to which incoming messages may be directed. An incoming message(s) is received at the terminal from a network element, where the incoming message includes the registered application identifier of the signaling protocol application that is to receive the incoming message at the terminal. Using this registered application identifier, the terminal directs the incoming message to the appropriate signaling protocol application.

In accordance with another embodiment of the invention, a method is provided for directing Session Initiation Protocol (SIP) messages over a network. The method includes generating at least one SIP registration message at a terminal concurrently operating multiple SIP-related applications. The SIP registration message includes at least a user address of record, and one or more contact headers each including at least a contact Uniform Resource Identifier (URI) of the terminal and an application identifier of one of the plurality of SIP-related applications. The SIP registration message is transmitted from the terminal to a SIP registrar on the network in order to register the terminal and corresponding SIP-related applications. Incoming messages received at the terminal include the registered application identifier of one of the SIP-related applications operating at the terminal. The terminal then forwards the incoming message to the SIP-related application identified by the application identifier received via the incoming message.

In more particular embodiments of such a SIP-based method, the SIP registration message is generated such that it associates the application identifier with the contact header by including the application identifier as optional user information in the contact URI provided in the contact header. In an even more particular embodiment, associating the application identifier with the contact header involves including the application identifier in an optional user information field of the contact header having a format substantially corresponding to "Contact:<sip: [userinfo]@hostport." In another particular embodiment of the method, forwarding the incoming message to the SIP-related application involves parsing the application identifier from the incoming message, identifying the SIP-related application corresponding to the application identifier, and forwarding the incoming message to the identified SIP-related application.

In accordance with another embodiment of the invention, a method is provided for directing messages in Session Initiation Protocol (SIP) communications over a network. The method includes generating at least one SIP registration message at a terminal concurrently operating a plurality of SIP-related applications, where the SIP registration message includes at least a user address of record, and one or more contact headers each including at least a contact Uniform Resource Identifier (URI) of the terminal and an application identifier of one of the SIP-related applications. The SIP registration message is transmitted to a SIP registrar on the network, to register the terminal and corresponding SIP-related applications. The SIP registrar creates a binding of the user address of record with the contact URI and application identifier. When another terminal, server, or other network element wants to transmit a message to the first terminal, the appropriate SIP proxy retrieves the binding upon receipt of the message from the other terminal, server, network element, etc. The SIP proxy forwards the message, including the application identifier, to the contact URI discovered by way of the binding. When the message is received at the terminal, the message is forwarded to the SIP-related application identified by the application identifier.

In accordance with another embodiment of the invention, a terminal operable on a network is provided, where the terminal includes a processing module and a multiple applications associated with a signaling protocol (e.g., SIP). The signaling protocol stack (e.g., SIP stack) is operable via the processing module, and is configured to register the terminal by generating and transmitting registration messages to a registrar. The registration messages each include at least a contact address and an application identifier corresponding to one of the multiple applications. The signaling protocol stack is further configured to receive and route incoming messages from the network to the application corresponding to the application identifier included with the registered contact address of the incoming message.

In accordance with another embodiment of the invention, a system is provided for managing Session Initiation Protocol (SIP) message transfers over a network. The system includes a SIP registrar for receiving registration requests and creating bindings of addresses of record and contact addresses. The system also includes at least SIP-enabled terminal coupled to the network, where the SIP-enabled terminal includes a processing module and a plurality of SIP-related applications. The terminal further includes a SIP stack operable via the processing module which is configured to register the terminal by generating and transmitting SIP registration messages to the SIP registrar. The SIP registration messages include at least a contact address and an application identifier corresponding to one of the SIP-related applications. The SIP stack is further configured to receive and route incoming messages from the network to the SIP-related application corresponding to the application identifier included with the registered contact address of the incoming message.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there are illustrated and described specific examples of a system, apparatus, and method in accordance with the invention.

BRIEF DESCRIPTION OF THE DRAWINGS

The invention is described in connection with the embodiments illustrated in the following diagrams.

DETAILED DESCRIPTION OF THE INVENTION

In the following description of the exemplary embodiment, reference is made to the accompanying drawings which form a part hereof, and in which is shown by way of illustration various embodiments in which the invention may be practiced. It is to be understood that other embodiments may be utilized, as structural and operational changes may be made without departing from the scope of the present invention.

Generally, the present invention provides a method and apparatus for managing signaling protocol communications, such as Session Initiation Protocol (SIP) communications, for terminals utilizing multiple client applications. The present invention provides multi-application support on top of a single protocol stack. Application identifiers are registered for each of a plurality of signaling protocol applications at the terminal. In one embodiment, the application identifiers are registered along with the registration of contact addresses for the terminal. Once registered, the terminal can receive incoming messages via the network and direct the messages to the appropriate one of the plurality of applications. This is accomplished by incorporating the registered application identifier into the destination address of the terminal (e.g., the contact address), and thus the terminal can be addressed by network elements, while also providing the appropriate application identifier to the terminal. Using the received application identifier, the terminal can direct the incoming message to the appropriate application.

Figure 1:
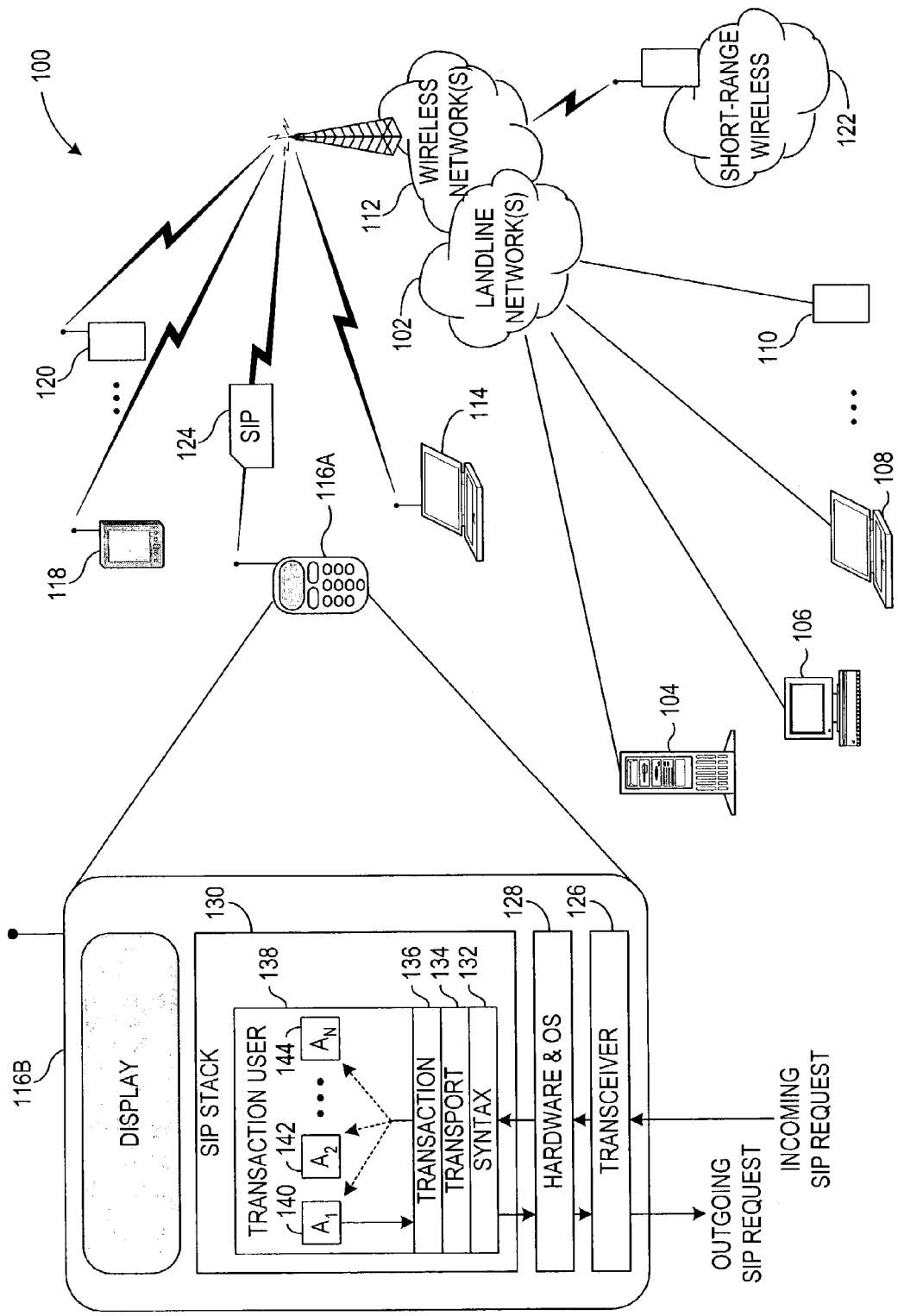
FIG. 1 illustrates a representative network environment in which the principles of the present invention may be employed.

FIG. 1 illustrates a representative network environment 100 in which the principles of the present invention may be utilized. In the representative network environment 100, voice, data, video, audio, and other information (generally referred to herein as data) may be communicated between devices in any number of known manners. These manners include communication via landline networks 102, which may include a Global Area Network (GAN) such as the Internet, one or more Wide Area Networks (WAN), Local Area Networks (LAN), and the like. Any computing device or other electronic device that supports the particular communication format may be involved in the communications, including servers 104, desktop computers 106 or workstations, laptop or other portable computers 108, or any other similar computing device capable of communicating via the network 102, as represented by generic device 110.

Data may also be communicated via one or more wireless networks 112, such as Global System for Mobile Communications (GSM), Universal Mobile Telecommunications System (UMTS), Personal Communications Service (PCS), Time Division Multiple Access (TDMA), Code Division Multiple Access (CDMA), or other mobile network transmission technology. Any number of different mobile devices can communicate with one another by way of the wireless network 112, or the wireless 112 and landline 102 networks. Such devices include laptop or other portable computers 114, mobile phones 116A and other mobile communicators, Personal Digital Assistants (PDA) 118, or any other similar electronic/computing device capable of communicating via the wireless network 112, as represented by generic device 120. Data can also be communicated between devices exclusively or collaboratively using short-range wireless networks 122 and technologies, such as Bluetooth, Wireless Local Area Network (WLAN), infrared (IR), etc. The present invention may be implemented in any such network configuration where messages may be communicated between devices.

As will become readily apparent to those skilled in the art from the description provided herein, the present invention may be utilized in connection with any number of different network communication protocols. One such communication protocol is the Session Initiation Protocol (SIP), which is generally described in the Internet Engineering Task Force (IETF) RFC 3261 (June 2002). Thus, while the present invention is also applicable to other functionally analogous protocols, the present invention is described in terms of SIP to facilitate an understanding of the invention.

Generally, SIP is a signaling protocol for establishing, modifying, and terminating "sessions" for network applications such as instant messaging, Internet telephony, presence, conferencing and other multimedia distribution, and the like. SIP enables network endpoints, referred to as user agents in SIP terminology, to discover one another and to establish the desired session. In order to locate other users, SIP utilizes an infrastructure of network proxy servers to which users can send registrations, invitations to sessions, and other requests via their terminals. SIP supports various aspects of establishing and terminating sessions, such as user availability, session setup such as ringing, session management, and some limited terminal capabilities.

SIP may also be used for non-session-based functions. For example, SIP supports a registration function, where a user sends to a proxy server a Uniform Resource Identifier (URI) such as a Uniform Resource Locator (URL) for which the user wishes to receive calls. This essentially serves as support for user mobility. Currently, the SIP REGISTER request is used to accomplish such registration. As will be described more fully below, the request includes a "contact" header(s) which includes the URI being registered by the user. More particularly, a user registers a SIP-enabled device by sending a REGISTER request to a registrar, which is user agent server (UAS) that places the information it receives from REGISTER requests into the location service for the domain that it handles. Thus, the registrar writes the association of the user's URI with the machine in which the user is currently logged (also known as a binding) to a location service where it can be used by a proxy. Incoming communications to the user's URI can then be routed to the address of the particular SIP-enabled device that the user is currently operating.

Returning to FIG. 1, SIP messages may be transmitted between the various SIP-enabled devices and across the landline networks 102 and/or wireless networks 112, 122. Such a SIP message 124 is illustrated as being communicated to/from wireless device 116A. Device 116B illustrates a more particular representation of some of the features of a SIP-enabled device. The device 116B includes, for example, a radio transceiver 126 (or discrete transmitter and receiver modules) and hardware including a processor operable in connection with an operating system (OS) 128. A SIP protocol stack 130 depicts a representative logical structure of SIP, which is structured as a "layered" protocol. Such layers include the syntax layer 132, transport layer 134, transaction layer 136, and transaction user (TU) 138 as is known in the art. The TU 138 includes the applications that are transaction users, such as client applications $A_1$ 140, $A_2$ 142, through $A_N$ 144.

As depicted by the multiple client applications 140, 142, 144, the user equipment used for SIP, as well as IP multimedia subsystems (IMS) implementations, may provide different functionalities at the same time. For example, one client application may allow the user to make multimedia calls, while another client application may enable other users/servers to subscribe to the user's location information. When such multiple client applications are implemented at a device 116B, the SIP stack 130 needs to determine which of the client applications an incoming message(s) is to be directed. More particularly, client 140 may transmit outgoing requests and receive incoming requests. However, because the equipment identifier for device 116B is common to all client applications 140, 142, 144, it must be determined to which of the client applications an incoming request is targeted. Separate SIP stacks could be used for each of the client applications 140, 142, 144, but this is a highly resource-consuming solution. Rather, these different client applications should all work on top of one common SIP stack. Other solutions such as distinguishing applications by port numbers may in some cases also be impractical, such as in the case of IMS, where the port number must not be changed by the SIP stack since it is assigned by the IPSec Security Association. The present invention provides a manner of distinguishing between such applications, thereby allowing incoming requests to be directed to the appropriate client application, without experiencing the drawbacks and/or limitations of the prior art.

Figure 2:
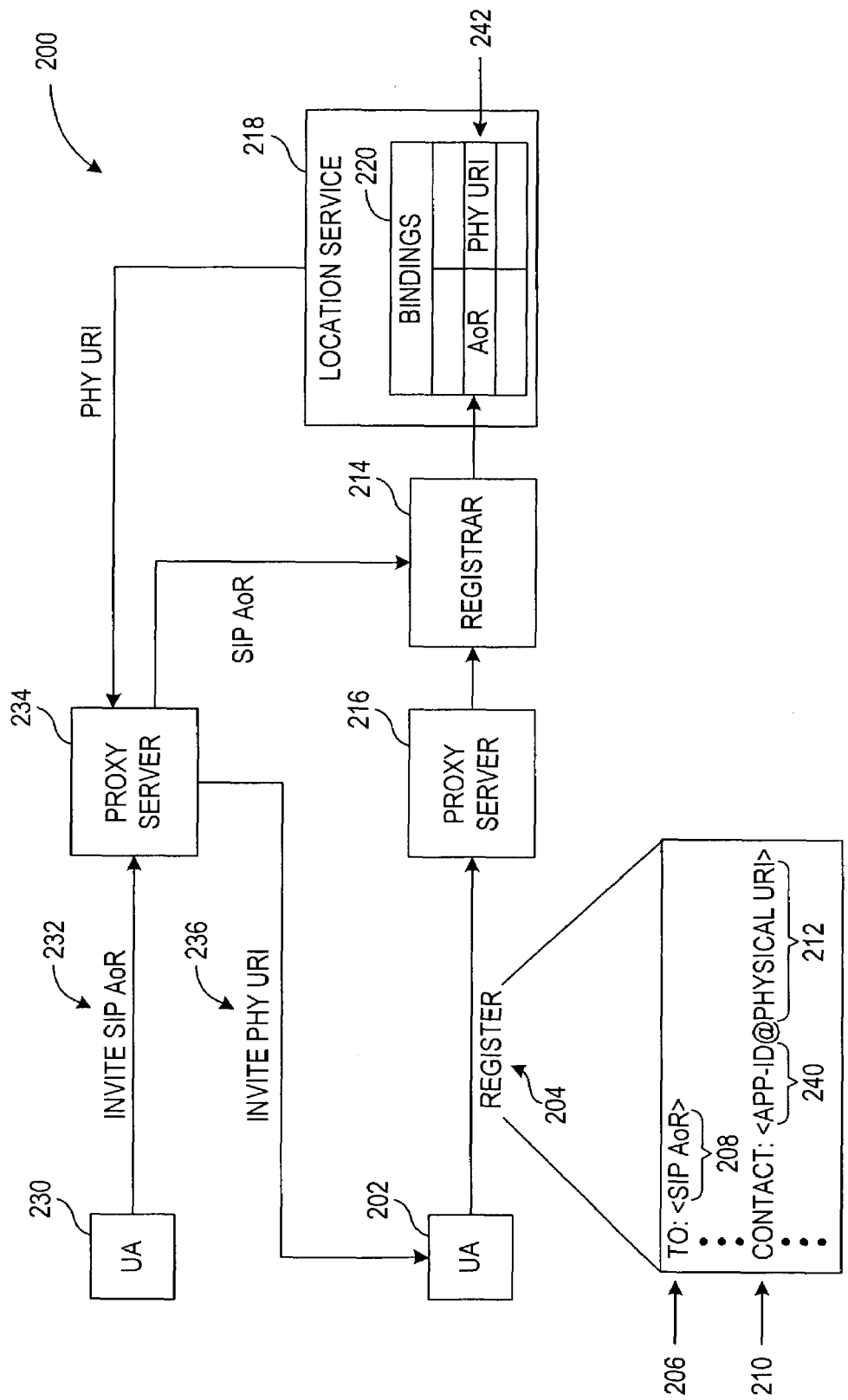
FIG. 2 is a block diagram illustrating a SIP-enabled network in which the principles of the present invention may be applied.

FIG. 2 is a block diagram illustrating a SIP-enabled network 200 in which the principles of the present invention may be applied. A first user agent (UA) 202, a User Agent Client (UAC) for purposes of the current description, represents an entity making a request. The request in this instance is a request to register a contact address(es), as depicted by the REGISTER request 204. The REGISTER request 204 includes the contact address(es) to which SIP requests for the "address-of-record" (AoR) should be forwarded. The AoR is provided in the "To" header field 206 of the request 204, where the AoR in the illustrated embodiment is represented as a SIP AoR 208. Generally, the "Contact" header field 210 includes values containing address bindings. These values typically include SIP or secure SIP (SIPS) URIs that identify particular SIP endpoints, such as SIP URLs, SIP telephone numbers, e-mail addresses, etc. One such endpoint identifier is the hostport or physical device URI 212 corresponding to the address of the physical device in which the requesting application is operating on (e.g., UA 202). The REGISTER request 204 can be sent from the UA 202 to a registrar 214 via a proxy server 216.

The registrar 214 stores the association of the AoR 208 and the device address 212 at a location service 218, which stores such bindings 220 for subsequently locating the UA 202 when a request is directed to the UA 202. For example, if UA 230 initiates a SIP request such as an INVITE, this request will include the SIP AoR as illustrated by the INVITE SIP AoR 232 request. A proxy server 234 obtains the UA 202 address by forwarding the request 232 to the registrar 214, and receiving the more specific address (PHY URI) bound to that SIP AoR. Using this address, the INVITE request can be appropriately delivered to the targeted UA 202, as depicted by the INVITE PHY URI request 236. Thus, by accessing such bindings, other users and/or servers are able to locate the registered user in order to initiate sessions or otherwise send messages. Other methods, such as the NOTIFY method, are similarly directed to a UA 202 whether initiated by a client or a server.

As previously indicated, there may be multiple applications operating on the UA 202, any (or all) of which may become involved in SIP transactions. Thus, it is not enough in a multi-application (i.e., multi-client) device to receive the INVITE, NOTIFY, MESSAGE, or other method targeted to the address of the physical device. Rather, the particular application that is the intended recipient of the request/response must be identified to complete the transaction. In accordance with the present invention, this is accomplished by providing an application identifier (APP-ID) to be stored together with the appropriate binding 220. In accordance with one embodiment of the invention, the APP-ID is provided during the registration process, thereby stored as a binding 220 at the location service 218. The particular application of the multiple applications at the registering UA 202 may provide the APP-ID, or alternatively the SIP stack associated with the UA 202 may generate the APP-ID. In yet another embodiment, another local application at the UA 202 or otherwise accessible to the UA 202 may generate the APP-ID.

In the illustrated embodiment of FIG. 2, the APP-ID is provided during the registration process as part of an existing SIP header, and more particularly as part of the "Contact" header 210. The existing SIP specification (RFC 3261) supports an optional element sequence referred to as "userinfo" in the IP address, SIP URI or other specific address of the registering UA 202. Thus, one embodiment of the present invention involves distinguishing between different UA applications by setting the user portion of the "Contact" address to an application-specific value. This is depicted at the illustrated by the APP-ID 240 included with the "Contact" header 210. The bindings 220 will thus include an association between the SIP AoR 206 and this APP-ID/physical address combination, as depicted by binding 242. Other manners of providing the APP-ID during registration may also be employed, such as contriving a new header that includes the APP-ID.

Figure 3:
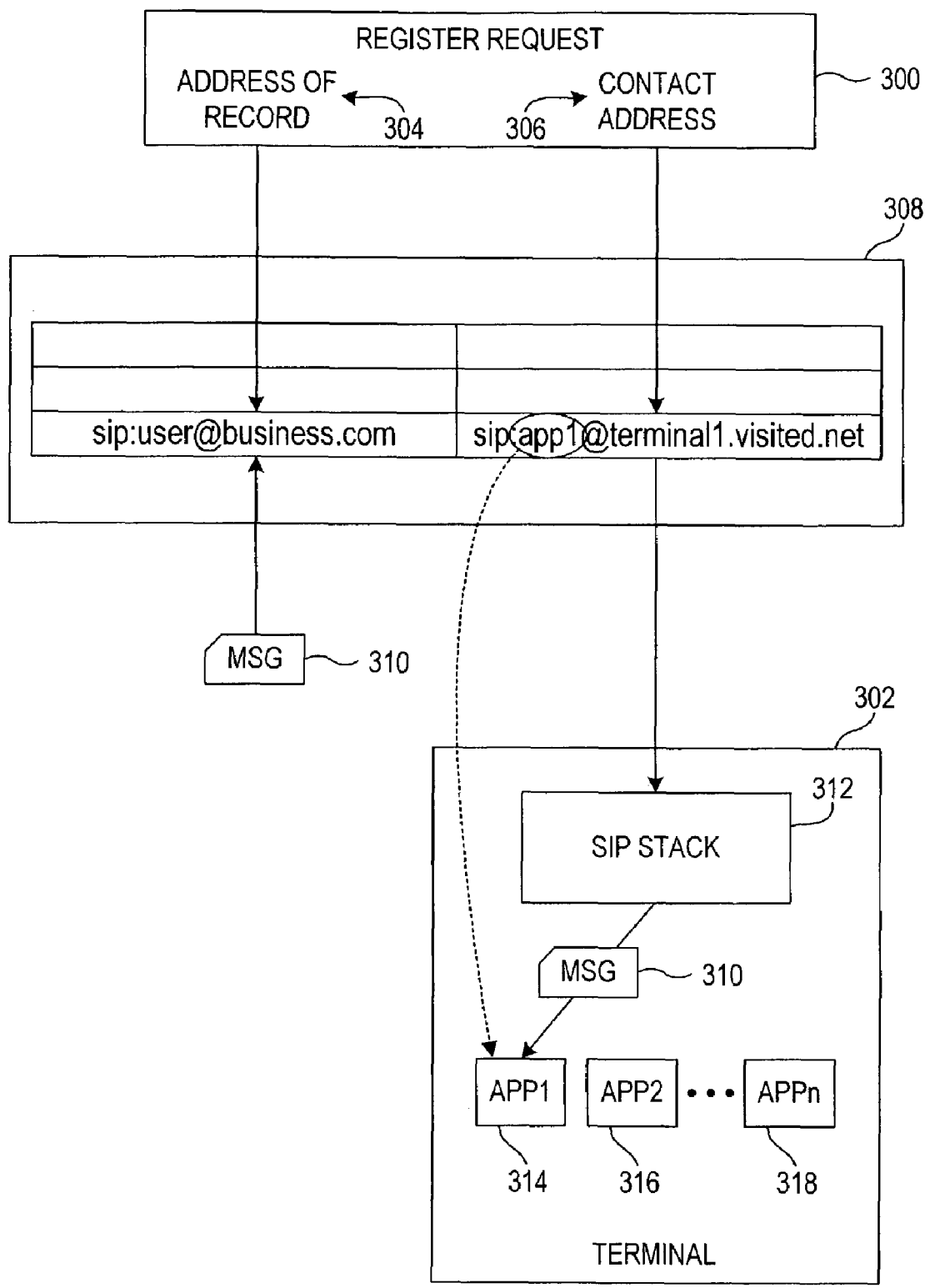
FIG. 3 illustrates a more particular embodiment of a manner of utilizing application identifiers during a registration procedure in accordance with one embodiment of the present invention.

FIG. 3 illustrates a more particular embodiment of a manner of utilizing application identifiers during a registration procedure in accordance with one embodiment of the present invention. A SIP REGISTER request 300 is provided by a user terminal 302, which includes at least an AoR 304 and a contact address 306. It should be noted that while the embodiment of FIG. 3 is described in terms of a SIP REGISTER request, the present invention is also applicable to other SIP methods, or similar registration requests associated with other signaling protocols. In the illustrated embodiment, the AoR 304 is depicted as <SIP:user@business.com>, while the contact address 306 is depicted as <SIP:app1@terminal1.visited.net>. This association or "binding" is stored in a database 308, such as a location service.

When a message 308 is targeted for the terminal 302, it identifies the AoR 304 in, for example, the "To" field or other analogous field of the message. Based on the binding, a registrar (not shown) identifies the associated contact address of <SIP:app1@terminal1.visited.net>. Using this address, the message 310 can be directed to the terminal 302. Upon receipt at the terminal 302, the SIP stack 312 determines which application the message 310 should be directed to. For example, the SIP stack 312 is aware of the applications APP1 314, APP2 316, ... APPn 318 that are present at the terminal 302. Upon receiving the message including the contact address (e.g., <SIP:app1@terminal1.visited.net>), the contact address is parsed to identify the APP-ID, which is "app1" in the illustrated example. Using any desired software, firmware, or hardware module, the SIP stack 312 can then direct the message 310 to APP1 314. For example, the SIP stack 312 may employ a compare function to compare the incoming APP-ID to a list of APP-IDs corresponding to applications APP1 314, APP2 316, etc. Other mechanisms may be employed, such as linked lists or the like, to identify the appropriate application based on the provided APP-ID.

The Third Generation Partnership Project (3GPP) has standardized the Universal Mobile Telecommunications System (UMTS) in various phases, where Release 5 included a system where the packet-switched core network (PS-CN) dominates over circuit-switched, and further took responsibility of telephony services. Release 5 introduced a new core network into the UMTS architecture, namely the IP Multimedia Subsystem (IMS) core that supports both telephony and multimedia services. The IMS interacts both with the Public Switched Telephone Network (PSTN) and the Internet (or other such large-scale network) to provide various multimedia services to users. Signaling in IMS is generally performed using SIP, and FIG. 3 is described in generic terms of a SIP-enabled network (or analogous protocol), which sets forth network elements such as proxy servers, registrars, and the like. In IMS, these generic network elements are more particularly named and defined, and the present invention is equally applicable to IMS-based communication. For example, a SIP proxy is identified as a Call State Control Function (CSCF), of which various types exist, including a proxy CSCF (P-CSCF), a serving CSCF (S-CSCF), and interrogating CSCF (I-CSCF). Generally, an S-CSCF performs and/or assists in performing a number of functions, including controlling session management functions for the IMS, providing access to home network servers such as location services, authentication, etc. A P-CSCF generally serves as the point of contact for applications (such as the mobile terminal client applications), and performs and/or assists in performing functions such as translation, security, authorization, etc. An I-CSCF generally serves as a point of contact in the home network for connections destined to a subscriber of that home network or roaming subscribers currently located within that network's service area. It may perform a number of functions, such as assigning an S-CSCF to a user performing registration, contacting the Home Subscriber Server (HSS) to obtain the S-CSCF address, forwarding SIP requests/responses to the S-CSCF, etc.

The present invention is well suited for IMS environments. The user equipment such as mobile terminals for IMS implementations may provide different functionalities at the same time, as previously described. In IMS, each application registers to the registrar (e.g., S-CSCF) in the home network. In IMS, port numbers cannot be changed by the SIP stack, and therefore port numbers cannot be used to uniquely identify client applications. Thus, the present invention is particularly useful in IMS environments where the UA has multiple client applications, where the appropriate client application needs to be identified in order to direct incoming messages thereto.

Figure 4:
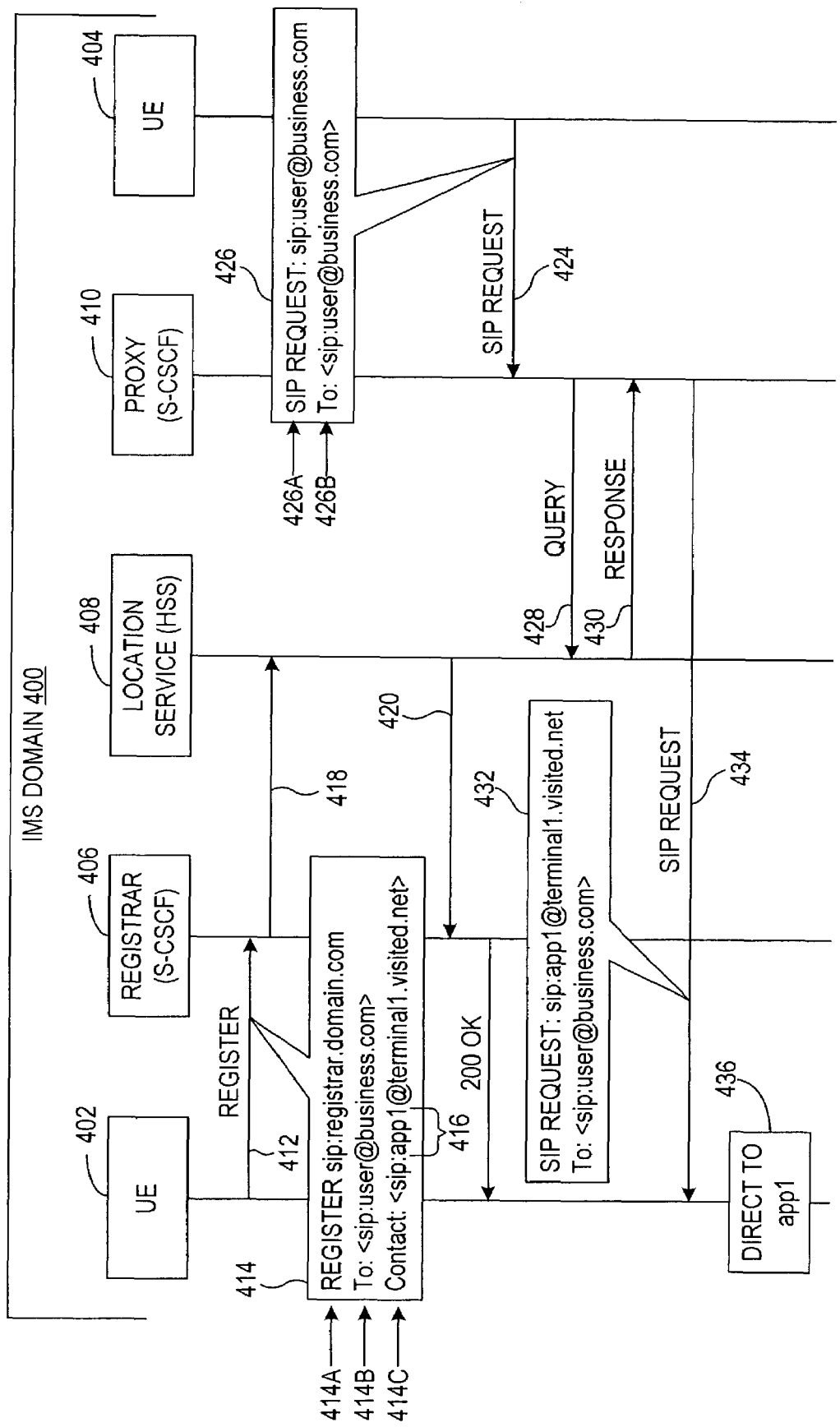
FIG. 4 is a message flow diagram illustrating a representative embodiment of the invention in an IMS environment.

FIG. 4 is a message flow diagram illustrating a representative embodiment of the invention in an IMS environment. The message flow illustrates one manner in which applications can be identified for appropriately directing incoming messages. The example illustrates a number of network elements that are part of the IMS domain 400, including User Equipment (UE) terminals 402, 404, a registrar/S-CSCF 406, location service/HSS 408, and SIP proxy/S-CSCF 410. Other network elements that may be involved in the message transactions (e.g., P-CSCF, I-CSCF, etc.) are not shown for purposes of simplicity, although those skilled in the art will readily appreciate from the description provided herein that such network elements may also be used. Further, some logical functions of the illustrated network elements may be provided by a single network element, such as both the registrar 406 and proxy 410 functionalities being provided by a single S-CSCF. Thus, such elements are depicted as distinct elements for ease of description.

The UEs 402, 404 represent devices that may include multiple client applications as previously described. In the illustrated embodiment, the UE 402 includes multiple client applications, registers with the location service/HSS 408, and directs incoming messages to the appropriate application in accordance with the invention. More particularly, the UE 402 sends a SIP REGISTER request to the S-CSCF 406 as shown on path 412. Relevant portions of the REGISTER request are shown at block 414. A REGISTER method is indicated at line 414A, including the REGISTER method name and a Request-URI identifying the domain of the location service for which the registration is intended. The "To" field shown at line 414B includes a URI of the AoR whose registration is to be created, which in illustrated embodiment is the SIP AoR of the user of UE 402. In accordance with the invention, an address binding(s) is created that includes an application-specific value corresponding to the application and AoR being registered.

In accordance with one embodiment of the invention shown in FIG. 4, the "Contact" header field shown at line 414C is used to create the address bindings to locate the particular UE 402, and includes an application-specific value 416 (i.e., app1) as the [userinfo] portion of the SIP Contact header. This application-specific value will ultimately be used to identify the particular application (app1) when the UE 402 receives incoming messages. As described, the application-specific value in the illustrated embodiment is provided by way of optional user information that may be provided in a SIP Contact header. More particularly, SIP specifications (i.e., RFC 3261) specifies that the Contact header includes a URI such as a SIP (or SIPS) URI, an absolute URI, etc. (addr-spec). The SIP/SIPS URI syntax is specified as shown in Example 1 below:

SIP-URI="sip:"[userinfo ]hostport uri-parameters
        [headers]                                          Example 1 where "userinfo" is specified as shown in Example 2 below:

userinfo=(user/telephone-subscriber) [":"password]
        "@"                                               Example 2

The "Contact" header may therefore include the optional "userinfo," identified as a user or telephone-subscriber value. In accordance with one embodiment of the invention, an application-specific value is provided with the userinfo, to provide, e.g.: "application-specific-value@" with the SIP URI of the Contact header. In the illustrated embodiment, this results in "app1" being used as the optional userinfo in the Contact header of the REGISTER request.

The REGISTER request prompts the appropriate actions with respect to the HSS 408 as depicted on path 418, where the association between the SIP AoR and the Contact address (es) is maintained. The appropriate response is returned to the S-CSCF 406 and UE 402 as shown on paths 420, 422, thereby completing the registration.

Messages destined to the SIP AoR (e.g., <sip:user@business.com>) will be routed using this binding. More particularly, a request from another UE 404 or from another network element may be targeted for the UE 402. For example, a NOTIFY request may be targeted to the UE 402 to notify it that a user, to which the appropriate client application of the UE 402 subscribed, is available. In another embodiment, the UE 404 may want to send a message (e.g., SIP MESSAGE method) to the UE 402. In such a case, the UE 404 sends a SIP request as shown on path 424. Relevant portions of the SIP request are shown at block 426. A SIP request (e.g., MESSAGE, etc.) is indicated at line 426A, which includes the Request-URI of"<sip:user@business.com>". The Request-URI is used to indicate the name of the destination for the SIP request, and as a SIP request is forwarded by proxies, the Request-URI can be changed as database lookups and invocation of features change the final destination of the SIP request. The "To" field shown at line 426B includes the SIP AoR of the intended recipient, which in the illustrated embodiment is the user of UE 402. The S-CSCF 410 queries the location service/HSS 408 as shown on path 428, which responds with the Contact address registered by the UE 402. This Contact address will thus include the application-specific value previously registered by the UE 402. The proxy 410 (which may be the registrar 406) replaces the Request-URI with the registered Contact address, which is "<sip:app1@terminal1.visited.net>" in the illustrated embodiment as shown by block 432 on path 434. When the message is received at the terminal 402, the SIP stack can direct it to the identified application as shown at block 436, based on the user part (e.g., app1) of the contact address.

Figure 5:
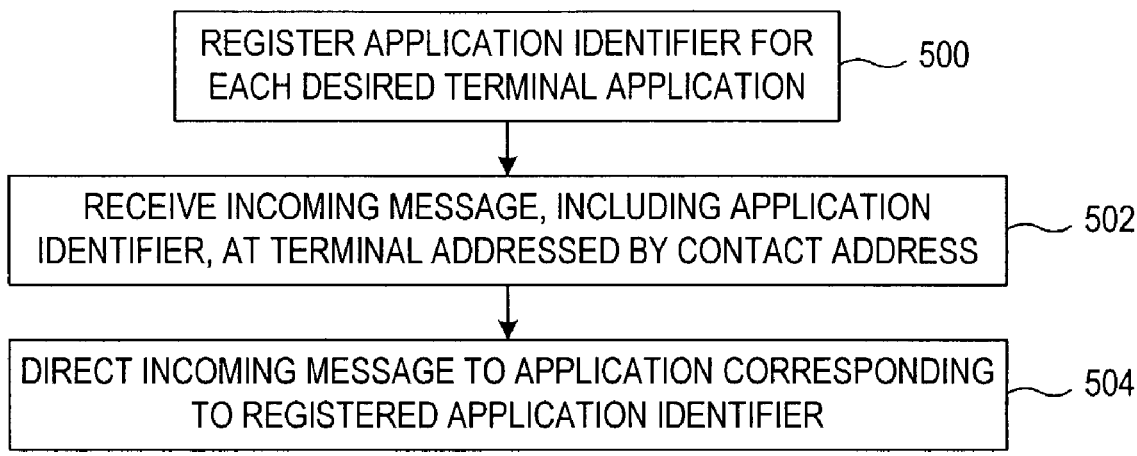
FIG. 5 is a flow diagram illustrating one embodiment of a manner for directing messages in signaling protocol communications in accordance with the present invention.

FIG. 5 is a flow diagram illustrating one embodiment of a manner for directing messages in signaling protocol communications in accordance with the present invention. An application identifier is registered 500 for each terminal application in which incoming messages may be directed. For example, the application identifier may be registered with a registrar, and in one embodiment is registered contemporaneously with registering a terminal contact address(es). The terminal receives 502 an incoming message, such as from the registrar, a proxy, or other network element, where the incoming message includes the previously-registered application identifier. The incoming message to the terminal is directed 504 by the terminal to an application corresponding to that application identifier. For example, in a SIP embodiment, the SIP stack can be used to direct the incoming message the appropriate local application, based on the application identifier associated with the incoming message. In one embodiment, the application identifier is included with the contact address of the terminal, in the same manner as the application identifier was included with the contact address upon its registration.

Figure 6:
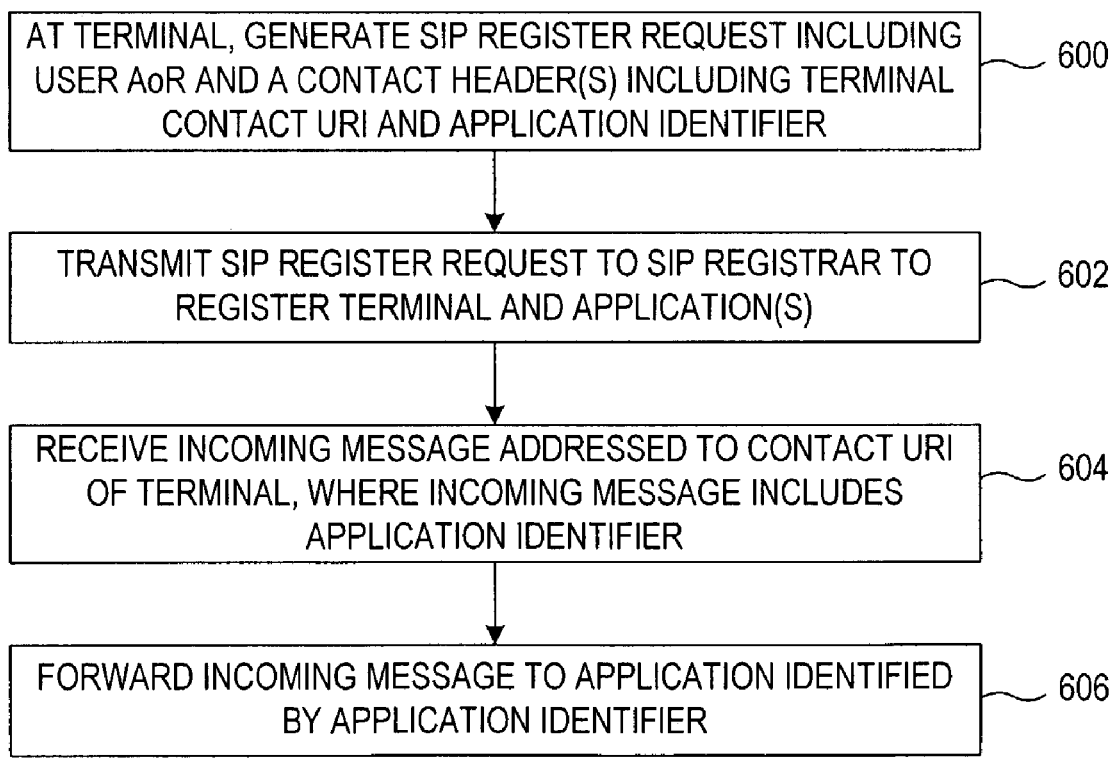
FIG. 6 is a flow diagram illustrating another embodiment of the invention, where the messages are transmitted in a SIP-enabled network.

FIG. 6 is a flow diagram illustrating another embodiment of the invention, where the messages are transmitted in a SIP-enabled network. In this embodiment, the terminal generates 600 a SIP REGISTER request that includes the user address of record (AoR), as well as a contact header(s) that includes a contact URI(s) and the application identifier(s). It should be recognized that multiple REGISTER requests may be submitted to register multiple applications, or a single REGISTER request may be submitted that includes multiple SIP Contact headers. The terminal transmits 602 the REGISTER request to a SIP registrar to register the terminal and the particular client application(s). After registration, the terminal may receive SIP-related messages, such as NOTIFY, MESSAGE, and other SIP methods. Thus, an incoming message addressed to the contact URI of the terminal is received 604 at the terminal, where the incoming message includes the application identifier of the relevant client application at the terminal. The terminal forwards 606 the incoming message to the relevant client application based on the application identifier.

Figure 7:
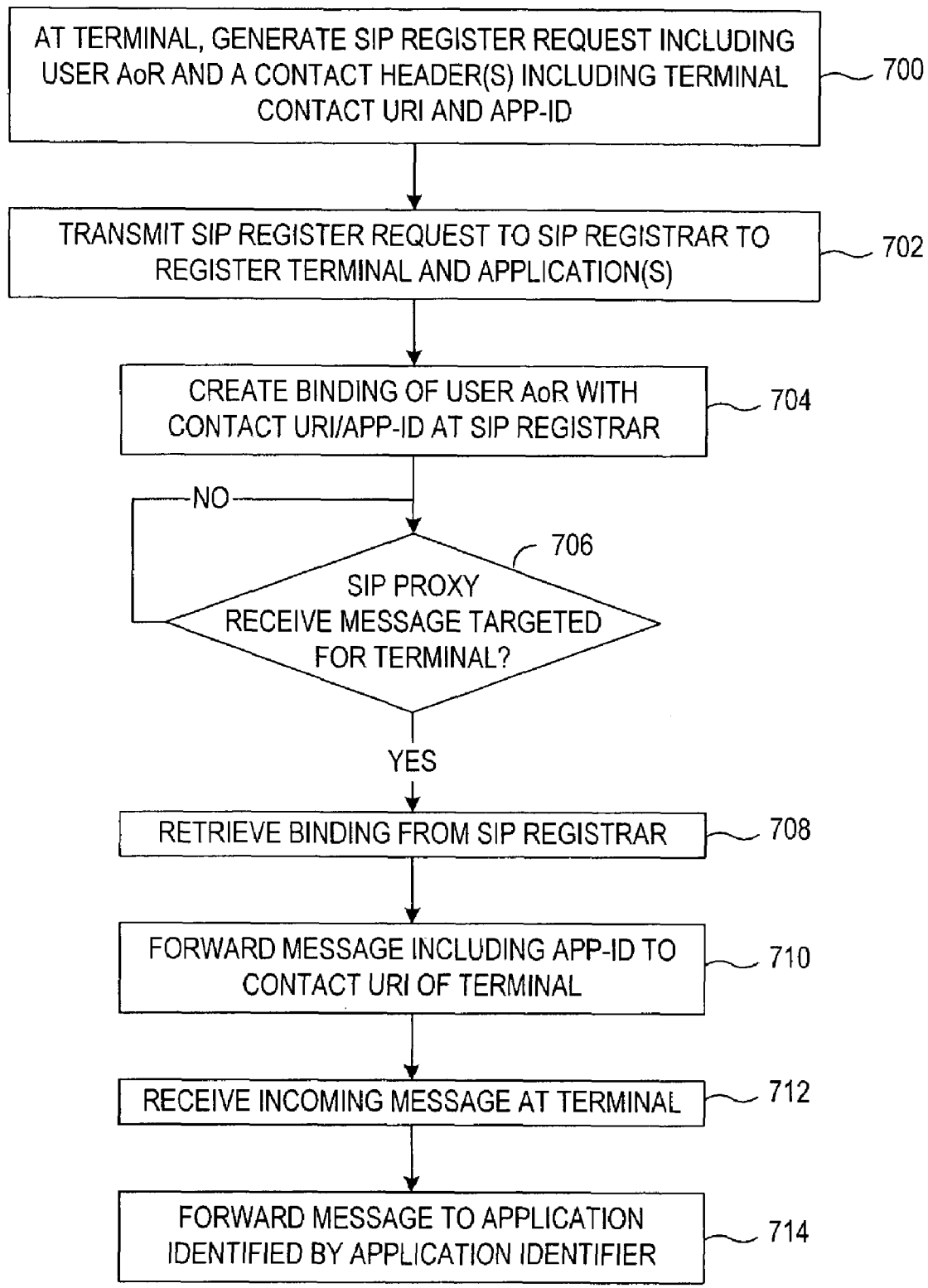
FIG. 7 is a flow diagram illustrating a more particular embodiment of a SIP-based registration and message receipt methodology in accordance with the present invention.

FIG. 7 is a flow diagram illustrating a more particular embodiment of a SIP-based registration and message receipt methodology in accordance with the present invention. Again, the terminal generates 700 a SIP REGISTER request that includes the user address of record (AoR), as well as a contact header(s) that includes a contact URI(s) and the application identifier(s). The terminal transmits 702 the REGISTER request to a SIP registrar to register the terminal and the particular client application(s). A binding is created 704 at the SIP registrar, where the user's AoR is associated or "bound" with the contact URI/APP-ID. At some point, a SIP proxy (e.g., the SIP registrar or other SIP-enabled network element) may receive a message that is targeted for the previously-registered terminal. When this occurs as determined at decision block 706, the appropriate binding is retrieved 708 from the SIP registrar, and the message is forwarded 710 to the terminal based on the contact URI obtained from the binding. The message includes the APP-ID that was previously registered with that contact URI. In one embodiment, the APP-ID and contact URI are provided in the Request-URI header, although other headers could also be used to provide this information. The message is received 712 at the terminal, where it can then be forwarded 714 to the SIP application identified by that APP-ID.

Figure 8:
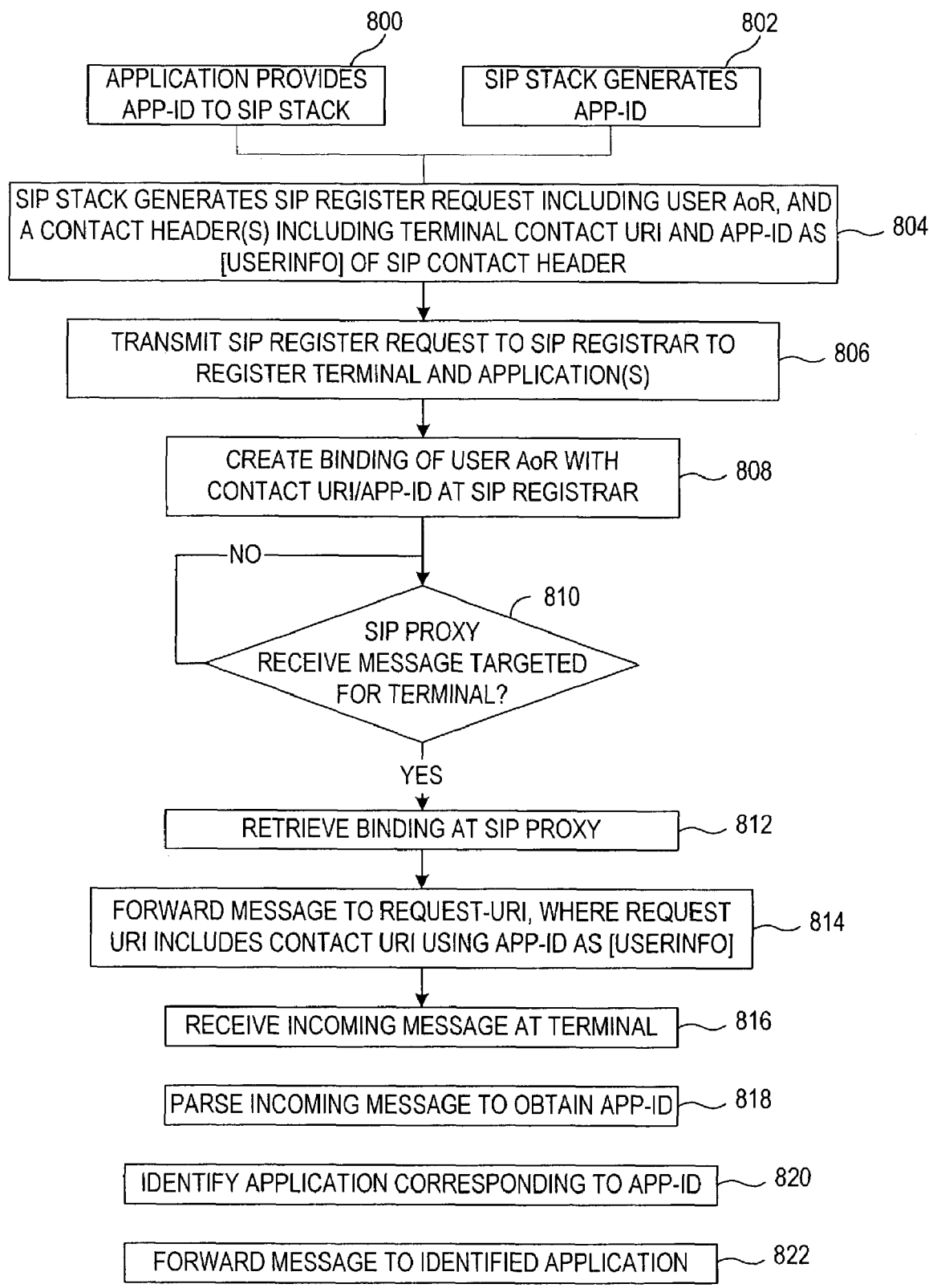
FIG. 8 is a flow diagram illustrating yet another particular embodiment of a SIP-based registration and message receipt methodology in accordance with the present invention.

FIG. 8 is a flow diagram illustrating yet another particular embodiment of a SIP-based registration and message receipt methodology in accordance with the present invention. An APP-ID is generated for an application in the multi-application terminal. The application itself may generate and provide the APP-ID to the SIP stack as shown at block 800, or alternatively the SIP stack may generate the APP-ID itself as shown at block 802. In another embodiment, some applications may generate their APP-IDs, while the SIP stack may generate the APP-IDs for other applications. The SIP stack generates 804 the SIP register request, which includes the user AoR, as well as at least one contact header that includes a contact URI and the APP-ID. In the illustrated embodiment, the APP-ID is included as the optional [userinfo] defined by RFC 3261. The REGISTER request is transmitted 806 to the SIP registrar in order to register the terminal and application(s). A binding is created 808 at the SIP registrar, where the user's AoR is bound with the contact URI/APP-ID. When the SIP proxy/registrar receives a message targeted for the terminal as determined at decision block 810, the appropriate binding is retrieved 812 from the SIP registrar, and the message is forwarded 814 to the address identified by the Request-URI header. In the illustrated embodiment, the Request-URI field will include the previously-registered contact URI/APP-ID. The message is received 816 at the terminal, and is parsed 818 to obtain the APP-ID. The application corresponding to the APP-ID is identified 820, and the message is then forwarded 822 to the identified application.

Figure 9:
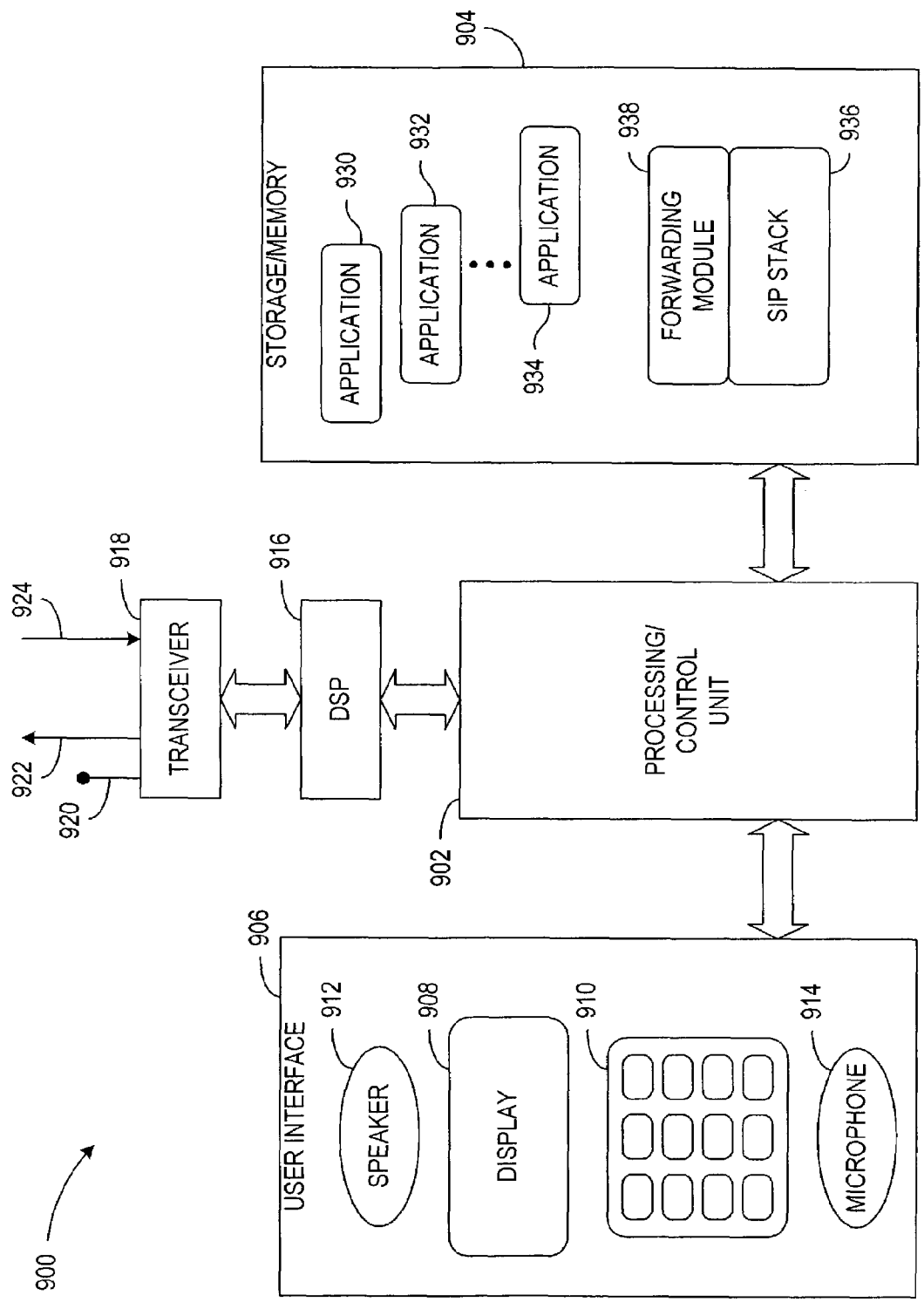
FIG. 9 is a block diagram illustrating a representative example of a multi-application mobile device capable of directing incoming messages to the appropriate application in accordance with the present invention.

The multi-application terminals in one embodiment of the invention are SIP-enabled mobile devices, such as mobile phones, PDAs, and other mobile communicators. A representative example of such a multi-application mobile device capable of directing incoming messages to the appropriate application in accordance with the present invention is illustrated in FIG. 9. The mobile device 900 utilizes computing systems to control and manage the conventional device activity as well as the functionality provided by the present invention. Hardware, firmware, software or a combination thereof may be used to perform the functions and operations described herein. The representative mobile device 900 includes a computing system capable of carrying out operations in accordance with the invention. For example, the representative mobile device 900 includes a processing/control unit 902, such as a microprocessor, reduced instruction set computer (RISC), or other central processing module. The processing unit 902 need not be a single device, and may include one or more processors. For example, the processing unit may include a master processor and associated slave processors coupled to communicate with the master processor.

The processing unit 902 controls the basic functions of the mobile device 900 as dictated by programs available in the program storage/memory 904. The storage/memory 904 may include an operating system and various program and data modules associated with the present invention. In one embodiment of the invention, the programs are is stored in non-volatile electrically-erasable, programmable read-only memory (EEPROM), flash ROM, etc., so that the programs are not lost upon power down of the mobile device. The storage 904 may also include one or more of other types of read-only memory (ROM) and programmable and/or erasable ROM, random access memory (RAM), subscriber interface module (SIM), wireless interface module (WIM), smart card, or other fixed or removable memory device. The relevant software for carrying out mobile device operations in accordance with the present invention may also be transmitted to the mobile device 900 via data signals, such as being downloaded electronically via one or more networks, such as the Internet and an intermediate wireless network(s).

For performing other standard mobile device functions, the processor 902 is also coupled to user-interface 906 associated with the mobile device 900. The user-interface (UI) 906 may include, for example, a display 908 such as a liquid crystal display, a keypad 910, speaker 912, and microphone 914. These and other UI components are coupled to the processor 902 as is known in the art. The keypad 910 may include alpha-numeric keys for performing a variety of functions, including dialing numbers, entering text, selecting displayed links, and other functions for conventional cellular or SIP-based communication. Other UI mechanisms may be employed, such as voice commands, switches, touch pad/screen, graphical user interface using a pointing device, trackball, joystick, or any other user interface mechanism.

The wireless device 900 also includes conventional circuitry for performing wireless transmissions over the mobile network. The DSP 916 may be employed to perform a variety of functions, including analog-to-digital (A/D) conversion, digital-to-analog (D/A) conversion, speech coding/decoding, encryption/decryption, error detection and correction, bit stream translation, filtering, etc. The transceiver 918, generally coupled to an antenna 920, transmits the outgoing radio signals 922 and receives the incoming radio signals 924 associated with the mobile device 900.

In the illustrated embodiment, the storage/memory 904 stores the various client applications and data used in connection with the present invention. For example, the storage 904 includes multiple applications 930, 932, 934 to provide the various desired functionalities. For example, one application 930 may offer the user the ability to make multimedia calls, while another application 932 may enable other users or servers to subscribe to the user's location information. In accordance with the present invention, these applications 930, 932, 934 can operate on top of one generic SIP stack 936. In one embodiment, the SIP stack 936 manages the communication of SIP messages to and from the mobile terminal 900. The SIP stack 936 includes the functionality to parse incoming messages to identify the relevant application 930, 932, 934 based on the application identifier. The SIP stack 936 may also include the functionality to forward the message to the appropriate application 930, 932, 934, or alternatively another forwarding module 938 or application may perform such a forwarding function based on the received APP-ID. It should be recognized that computing devices coupled to landline networks perform analogous operations as those described in connection with the mobile device 900 shown in FIG. 9.

Using the description provided herein, the invention may be implemented as a machine, process, or article of manufacture by using standard programming and/or engineering techniques to produce programming software, firmware, hardware or any combination thereof. Any resulting program(s), having computer-readable program code, may be embodied on one or more computer-usable media, such as disks, optical disks, removable memory devices, semiconductor memories such as RAM, ROM, PROMS, etc. Articles of manufacture encompassing code to carry out functions associated with the present invention are intended to encompass a computer program that exists permanently or temporarily on any computer-usable medium or in any transmitting medium which transmits such a program. Transmitting mediums include, but are not limited to, transmissions via wireless/radio wave communication networks, the Internet, intranets, telephone/modem-based network communication, hard-wired/cabled communication network, satellite communication, and other stationary or mobile network systems/communication links. From the description provided herein, those skilled in the art will be readily able to combine software created as described with appropriate general purpose or special purpose computer hardware to create a system and method in accordance with the present invention.

The foregoing description of the exemplary embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather defined by the claims appended hereto.

What is claimed is:

1. A method for directing messages in signaling protocol communications occurring over a network, comprising:

registering an application identifier for each of a plurality of signaling protocol applications available at the terminal to which incoming messages may be directed;

receiving from a network element at least one of the incoming messages at a contact address of the terminal, wherein the incoming message includes the registered application identifier of the signaling protocol application to receive the incoming message at the terminal;

directing the incoming message to the signaling protocol application corresponding to the registered application identifier;

registering an association of a terminal user's address of record and the contact address of the terminal to which incoming messages are to be directed; and wherein registering an application identifier comprises associating the application identifier and the contact address of the terminal with the address of record.

2. The method of claim 1, wherein associating the application identifier with the contact address of the terminal comprises including the application identifier as a field of a contact address header.

3. The method of claim 1, wherein registering an application identifier comprises transmitting at least one registration message including the contact address and at least one of the application identifiers to a network registrar.

4. The method of claim 3, wherein receiving from a network element at least one of the incoming messages comprises receiving the incoming messages from the network registrar.

5. The method of claim 1, wherein directing the incoming message to the signaling protocol application corresponding to the registered application identifier comprises:

parsing the application identifier from the incoming message;

identifying the signaling protocol application corresponding to the application identifier; and forwarding the incoming message to the identified signaling protocol application.

6. A method for directing Session Initiation Protocol (SIP) messages over a network, comprising:

generating at least one SIP registration message at a terminal concurrently operating a plurality of SIP-related applications, wherein the SIP registration message includes at least a user address of record, and one or more contact headers each including at least a contact Uniform Resource Identifier (URI) of the terminal and an application identifier of one of the plurality of SIP-related applications;

transmitting the SIP registration message to a SIP registrar on the network to register the terminal and corresponding SIP-related applications;

receiving at the terminal at least one incoming message at the contact URI of the terminal, wherein the incoming message includes the application identifier of one of the SIP-related applications operating at the terminal; and forwarding the incoming message to the SIP-related application identified by the application identifier received via the incoming message.

7. The method of claim 6, further comprising assigning one of the application identifiers to each of the SIP-related applications at the terminal.

8. The method of claim 7, wherein generating the SIP registration message comprises generating the SIP registration message at a SIP message processing stack of the terminal, and wherein the SIP-related applications provide their respective assigned application identifiers to the SIP message processing stack for inclusion into the SIP registration message.

9. The method of claim 7, wherein generating the SIP registration message comprises generating the SIP registration message at a SIP message processing stack of the terminal, and wherein the SIP message processing stack generates the application identifiers for inclusion into the SIP registration message.

10. The method of claim 6, wherein generating the SIP registration message at the terminal comprises associating the application identifier with the contact header by including the application identifier as optional user information in the contact URI provided in the contact header.

11. The method of claim 10, wherein associating the application identifier with the contact header comprises including the application identifier in an optional user information field of the contact header having a format including at least: Contact: <sip: [userinfo]@hostport.

12. The method of claim 6, wherein forwarding the incoming message to the SIP-related application identified by the application identifier received via the incoming message comprises:
parsing the application identifier from the incoming message;
identifying the SIP-related application corresponding to the application identifier; and
forwarding the incoming message to the identified SIP-related application.

13. The method of claim 6, wherein the at least one SIP registration message comprises a plurality of SIP registration messages, each including at least the user address of record, and at least one of the contact headers.

14. The method of claim 6, wherein receiving at least one incoming message at the contact address of the terminal comprises receiving the at least one incoming message from a SIP proxy.

15. The method of claim 6, wherein receiving at least one incoming message at the contact address of the terminal comprises receiving the at least one incoming message from the SIP registrar.

16. A method for directing messages in Session Initiation Protocol (SIP) communications over a network, comprising:
generating at least one SIP registration message at a terminal concurrently operating a plurality of SIP-related applications, wherein the SIP registration message includes at least a user address of record, and one or more contact headers each including at least a contact Uniform Resource Identifier (URI) of the terminal and an application identifier of one of the plurality of SIP-related applications;
transmitting the SIP registration message to a SIP registrar on the network to register the terminal and corresponding SIP-related applications;
creating a binding of the user address of record with the contact URI and application identifier at the SIP registrar;
retrieving the binding at a SIP proxy upon receipt of a message from a network element and targeted for the user address of record, and forwarding the message including the application identifier to the contact URI discovered via the binding; and
receiving the message at the terminal, and forwarding the message to the SIP-related application identified by the application identifier.

17. The method of claim 16, wherein the network element that sends the message comprises another terminal operable on the network.

18. The method of claim 16, wherein the network element that sends the message comprises a SIP proxy operable on the network.

19. The method of claim 16, wherein the SIP registrar serves as the SIP proxy which retrieves the binding.

20. A terminal operable on a network, comprising:
a processing module;
a plurality of applications associated with a signaling protocol; and
a signaling protocol stack operable via the processing module and configured to register the terminal by generating and transmitting to a registrar registration messages each including at least a user address of record, a contact address, and an application identifier corresponding to one of the plurality of applications, and to receive and route incoming messages from the network that identify the user address of record to the application corresponding to the application identifier included with the registered contact address of the incoming message and associated with the user address of record.

21. The terminal as in claim 20, wherein the signaling protocol comprises the Session Initiation Protocol (SIP), and the signaling protocol stack comprises a SIP stack.

22. The terminal as in claim 21, wherein the SIP stack is configured to generate the registration message to include a SIP contact header including at least the application identifier and the contact address presented as a physical device address of the terminal to which incoming messages may be directed.

23. The terminal as in claim 22, wherein the SIP stack is configured to include the application identifier as at least part of an optional user information field of the SIP contact header.

24. The terminal as in claim 21, wherein the SIP stack is configured to parse the incoming messages to identify the application identifier included with the registered contact address, and to forward the incoming message to the application associated with the identified application identifier.

25. The terminal as in claim 20, wherein the terminal comprises a mobile terminal that communicates wirelessly on the network.

26. The terminal as in claim 20, wherein the network comprises a landline network, and wherein the terminal is coupled to the landline network.

27. A system for managing Session Initiation Protocol (SIP) message transfers over a network, comprising:
a SIP registrar for receiving registration requests and creating bindings of addresses of record and contact addresses;
at least one SIP-enabled terminal coupled to the network, the SIP-enabled terminal comprising:
a processing module;
a plurality of SIP-related applications; and
a SIP stack operable via the processing module and configured to register the terminal by generating and transmitting SIP registration messages to the SIP registrar, wherein each SIP registration message includes at least a SIP address of record, a contact address and an application identifier corresponding to one of the plurality of SIP-related applications, and wherein the SIP stack is further configured to receive and route incoming messages from the network that identify the SIP address of record to the SIP-related application corresponding to the application identifier included with the registered contact address of the incoming message and associated with the SIP address of record.

28. The system as in claim 27, wherein the registrar comprises a Serving Call State Control Function (S-CSCF) operable in an IMS core.

29. A computer-readable medium having instructions stored thereon which are executable by a computer system for directing Session Initiation Protocol (SIP) messages over a network by performing steps comprising:

generating at least one SIP registration message at a terminal concurrently operating a plurality of SIP-related applications, wherein the SIP registration message includes at least a user address of record, and one or more contact headers each including at least a contact Uniform Resource Identifier (URI) of the terminal and an application identifier of one of the plurality of SIP-related applications;

transmitting the SIP registration message to a SIP registrar on the network to register the terminal and corresponding SIP-related applications;

receiving at the terminal at least one incoming message at the contact URI of the terminal, wherein the incoming message includes the application identifier of one of the SIP-related applications operating at the terminal; and forwarding the incoming message to the SIP-related application identified by the application identifier received via the incoming message.

30. The computer-readable medium as in claim 29, wherein the instructions for generating the SIP registration message at the terminal comprise instructions for associating the application identifier with the contact header by including the application identifier as optional user information in the contact URI provided in the contact header.

31. The computer-readable medium as in claim 30, wherein the instructions for associating the application identifier with the contact header comprise instructions for including the application identifier in an optional user information field of the contact header having a format including at least: Contact: <sip: [userinfo]@hostport.

32. The computer-readable medium as in claim 29, wherein the instructions for forwarding the incoming message to the SIP-related application comprise instructions for performing steps including:

parsing the application identifier from the incoming message;

identifying the SIP-related application corresponding to the application identifier; and forwarding the incoming message to the identified SIP-related application.

* * * * *